United States Patent
Breit et al.

(10) Patent No.: US 6,424,105 B1
(45) Date of Patent: Jul. 23, 2002

(54) REAL-TIME CONTROL OF FEEDBACK SIGNALS TO A MOTOR FOR OPTIMUM PERFORMANCE

(75) Inventors: Stephen M. Breit, Edmond; Nolan D. Wanner, Bartlesville, both of OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/328,150

(22) Filed: Jun. 8, 1999

(51) Int. Cl.[7] .............................................. H02K 29/00
(52) U.S. Cl. ........................ 318/254; 318/615; 318/616
(58) Field of Search ................................. 318/254, 439, 318/606, 607, 608, 615, 616, 617, 632, 639

(56) References Cited

U.S. PATENT DOCUMENTS

| | | |
|---|---|---|
| 4,108,499 A | 8/1978 | Sandbert |
| 4,288,737 A | 9/1981 | McClain et al. |
| 4,455,513 A | 6/1984 | Fulton et al. |
| 4,488,101 A | 12/1984 | Studtmann |
| 4,686,437 A | 8/1987 | Langley et al. |
| 4,743,815 A | 5/1988 | Gee et al. |
| 4,831,277 A | 5/1989 | Christopher |
| 4,928,043 A | 5/1990 | Plunkett |
| 5,233,275 A | 8/1993 | Danino |
| 5,343,127 A | 8/1994 | Maiocchi |
| 5,708,337 A | 1/1998 | Breit et al. |
| 5,963,706 A | * 10/1999 | Baik .......................... 318/254 |
| 6,046,560 A | * 4/2000 | Lu et al. ..................... 318/254 |

* cited by examiner

Primary Examiner—Khanh Dang
(74) Attorney, Agent, or Firm—Fletcher, Yoder & Van Someren

(57) ABSTRACT

An electric motor that may be used in a remote location, such as in a wellbore for pumping production fluids. The electric motor is designed to permit real-time adjustment of the position feedback signals to optimize motor performance. A position sensor is coupled to the rotor to sense rotor position. Simultaneously, a parameter, such as shaft twist, is measured, and a feedback control signal is provided. A processor receives the position sensor signals and the feedback control signals, and adjusts the energization of the stator windings to optimize motor performance.

19 Claims, 4 Drawing Sheets

REAL-TIME CONTROL OF FEEDBACK SIGNALS TO A MOTOR FOR OPTIMUM PERFORMANCE

FIELD OF THE INVENTION

The present invention relates generally to variable control of an electric motor to optimize its performance, and particularly to control of a brushless, permanent magnet motor utilized in a remote location, such as a downhole, wellbore environment.

BACKGROUND OF THE INVENTION

Currently, motors, such as brushless, permanent magnet motors, have a rotor with permanent magnets rotatably mounted within a stator having a plurality of windings. The windings are sequentially energized to cause the rotor to rotate.

Generally, such motors use a direct couple rotor feedback position control. The rotor position or the BEMF of the unenergized coil is used to determine the exact rotor position. A position signal is then fed back to a controller which uses the position signal to sequentially energize the windings of the motor.

Presently, once the motor and motor control are designed, the position feedback signals cannot be changed during operation. Typically, the motor must be shut down, and the feedback sensor position relocated before the motor is restarted. This process is repeated until the best operating point can be determined.

In many applications, such as the remote operation of a submergible motor, this may not be possible. Submergible motors are used, for instance, in electric submergible pumping systems of the type utilized in pumping petroleum from wells beneath the surface of the earth. It is not feasible to remove the motor from the well in an effort to optimize the rotor position feedback signals for best performance.

The position of the rotor can be sensed in a variety of ways. For example, a plurality of Hall effect sensors can be used to sense the position of the rotor. The Hall effect sensors typically are mounted on a printed circuit board and fastened to the motor around the rotor. The Hall effect devices are located in this fixed position relative to the magnets used on the rotor and the windings of the stator. As the rotor magnets move past individual Hall effect sensors, a feedback signal or signals is provided to a control board which, in turn, uses these feedback signals to direct the firing of insulated gate bipolar transistors (IGBTs) to sequentially energize the windings of the stator.

However, because the position sensors typically are located at a single location along the axis of the rotor, the feedback signals may not optimize the performance of the motor when operating under load. For example, placing a load on the motor may cause a twisting of the drive shaft on which the rotor is mounted. This is particularly true with relatively long thin motors, such as those used in subterranean, wellbore environments. The twisting of the shafts, and thus the rotor, effectively causes suboptimal sequential energization of the stator windings relative to the rotor position.

It would be advantageous to be able to modify the position feedback signal in accordance with changes, such as shaft twisting, that occur during operation. It also would be advantageous to optimize the performance of the motor during real-time operation.

SUMMARY OF THE INVENTION

The present invention features an electric motor that comprises a stator and a rotor. The stator includes a plurality of windings, and the rotor is rotatably mounted in the stator. An energization system is coupled to the stator to sequentially energize the plurality of windings. A position sensor system is coupled to the rotor to sense rotor position. A processor is coupled to the energization system and to the position sensor system. The processor receives input signals from the position sensor system and outputs a control signal to the energization system based on the input signals. A feedback device generates a feedback control signal to the processor. The processor automatically adjusts the control signal to the energization system according to the feedback control signal.

According to another aspect of the invention, a method is provided for optimizing performance of a motor having a stator with a plurality of windings and a rotor rotatably mounted with respect to the stator. The method includes sequentially energizing the plurality of windings to rotate the rotor. The method further includes measuring the angular position of the rotor, and outputting a position feedback signal indicative of a position of the rotor, to a processor. The method further includes outputting a control feedback signal to the processor, and adjusting the position feedback signal according to the control feedback signal. The energization of the plurality of windings is controlled according to the adjusted position feedback signal.

According to another aspect of the invention, a method is provided for real-time adjustment of a motor to reduce the detrimental performance effects of a twisting of a motor shaft on which a rotor is mounted. The method includes measuring the angular position of the rotor at an axial position along the rotor, and measuring a parameter indicative of a degree of twisting in the shaft. The method further includes outputting a feedback signal corresponding to the angular position, and controlling energization of the motor based on the feedback signal and the measured parameter to compensate for the twisting of the rotor shaft.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

The present invention may be utilized with a variety of electric motors to facilitate modification of position feedback signals in accordance with physical changes, e.g. shaft twisting, that occur during operation of the electric motor. However, FIG. 1 is used to describe one exemplary electric motor that is aided by the present invention, due to its particular design and the environment in which it is used.

Figure 1:
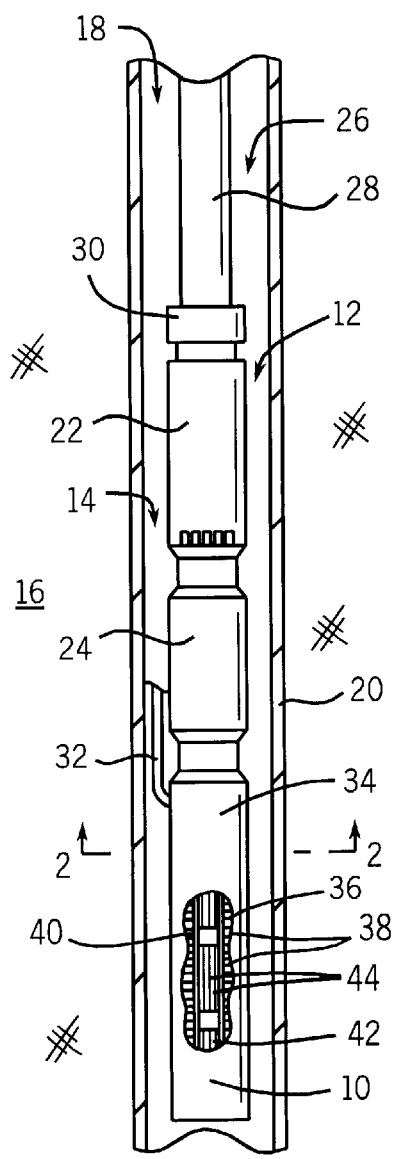
FIG. 1 is a front elevational view of a submergible motor, according to a preferred embodiment of the present invention, and as utilized in a submergible pumping system positioned in a wellbore.

Referring generally to FIG. 1, an elongated, electric motor 10 is illustrated, according to a preferred embodiment of the present invention. Motor 10 is illustrated in an exemplary environment or application in that it is combined into an electric submergible pumping system 12. Motor 10 typically is a brushless, permanent magnet motor used in a wellbore environment, and it has a long but narrow physical configuration to permit operation within the confines of a wellbore.

Electric submergible pumping system 12 is designed for deployment in a well 14 within a geological formation 16 containing desirable production fluids, such as petroleum. A narrow wellbore 18 is drilled into the geological formation 16 and lined with a wellbore casing 20. System 12 is deployed within wellbore 18 to a desired location for pumping of the wellbore fluids.

The illustrated submergible pumping system 12 also includes other components. For example, motor 10 powers a submergible pump 22 that typically is connected to motor 10 by a motor protector 24. Motor protector 24 is designed to protect motor 10 from contamination by wellbore fluids, and to permit equalization of the internal pressure of motor 10 with the external pressure in the wellbore.

Submergible pumping system 12 typically is suspended in wellbore 18 by a deployment system 26, such as coiled tubing, cable or the illustrated production tubing 28. Deployment system 26 is connected to submergible pumping system 12 by an appropriate head or connector 30.

Furthermore, power is supplied to elongated motor 10 by a power cable 32 that is routed along deployment system 26 from the earth's surface. It should be noted that power cable 32 typically comprises three conductors that provide a three-phase power signal to motor 10. However, power cable 32 may also include one or more other conductive lines for conveying signals between a control system at the earth's surface and one or more components of the submergible pumping system 12. Alternatively, the three conductors used to convey the three-phase power signal to motor 10 also can be used to convey other signals between the submergible pumping system and a control at the earth's surface.

Figure 2:
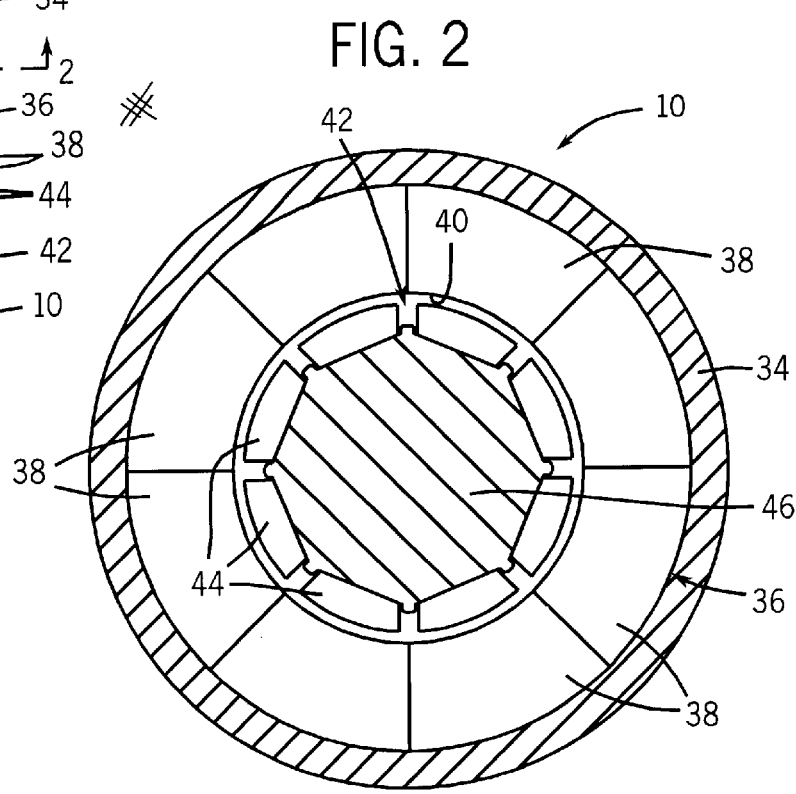
FIG. 2 is a cross-sectional view taken generally along line 2—2 of FIG. 1.

Motor 10 preferably is a brushless, permanent magnet motor that comprises an elongated housing 34 having a generally tubular shape. Disposed within elongated housing 34 is a core or stator 36 that includes a plurality of windings 38. The windings typically are formed from a plurality of plates or laminations wrapped by coils. As illustrated further in FIG. 2, stator 36 includes a central, longitudinal opening 40 sized to rotatably receive a rotor assembly 42. A plurality of permanent magnets 44 are attached to rotor assembly 42.

Figure 3:
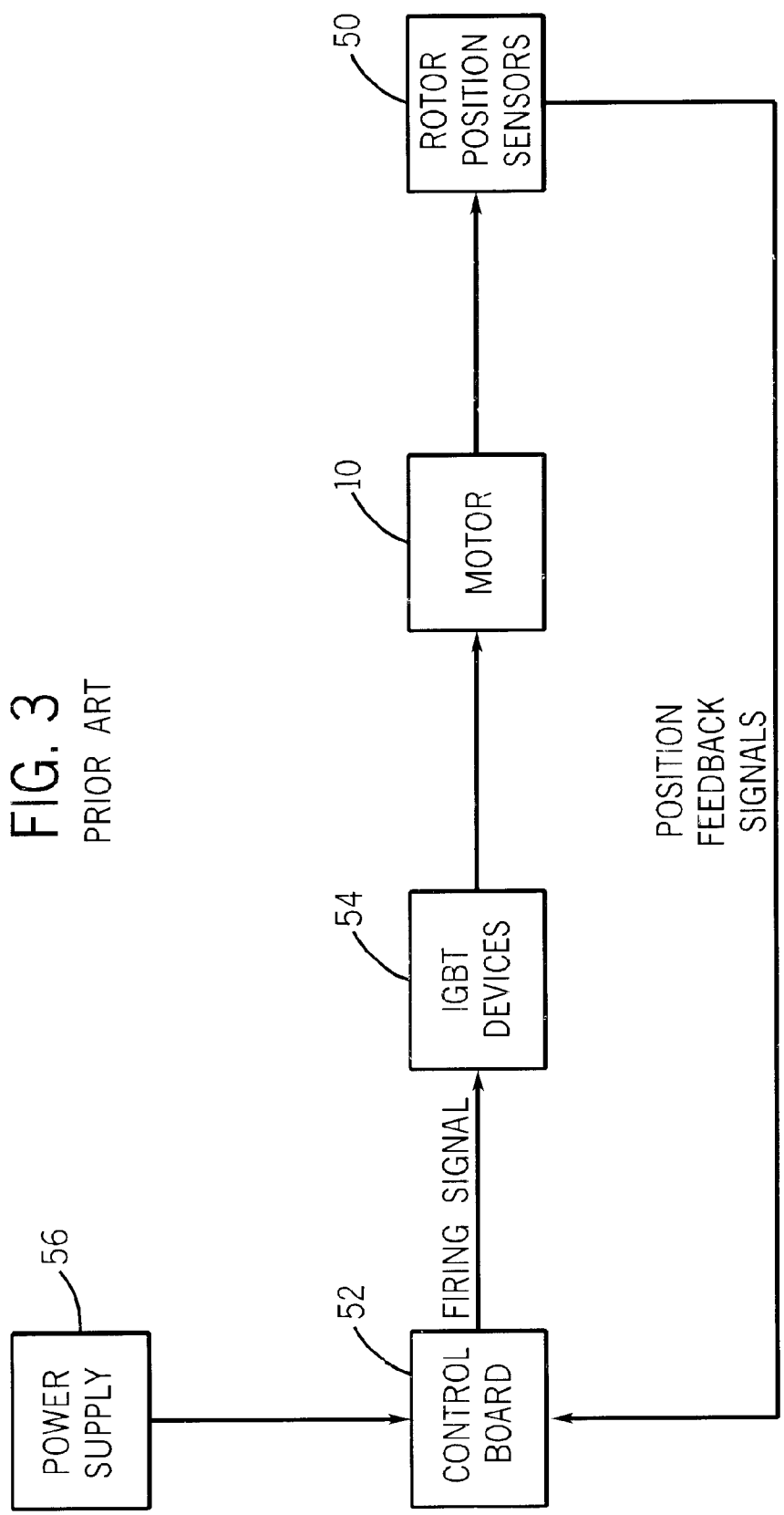
FIG. 3 is a schematic diagram of a prior art motor control system.

Conventionally, electric motors, such as brushless, permanent magnet motors used in downhole environments, utilized a control system such as that illustrated in FIG. 3. In this prior art control system, a sensor or sensors 50 are used to determine the position of rotor assembly 42. The position of the rotor can be determined directly by Hall effect devices, as known to those of ordinary skill in the art, or by the winding BEMFs of the unenergized coil. (A full description of a system for utilizing the winding BEMFs without directly sensing rotor position is described in U.S. Pat. No. 5,708,337, issued on Jan. 13, 1998.)

A signal from sensor 50 is fed back to a control board 52 that controls energization of the motor windings 38. Effectively, control board 52 provides firing signals to direct the firing of a plurality of IGBT devices 54, based on the feedback signals received from sensors 50. The IGBT devices sequentially energize windings 38 of motor 10. Power is supplied to control board 52 by an appropriate power supply 56.

In the design illustrated in FIG. 3, there is no method of changing the position feedback signals during operation. The motor 10 must be shut down, and the feedback signal position sensors relocated prior to restarting of motor 10. The process is repeated until the best operating point can be determined. This method of adjustment is difficult, if not impossible, when motor 10 is operated at remote locations, such as the downhole locations in which electric submergible pumping systems are found.

Figure 4:
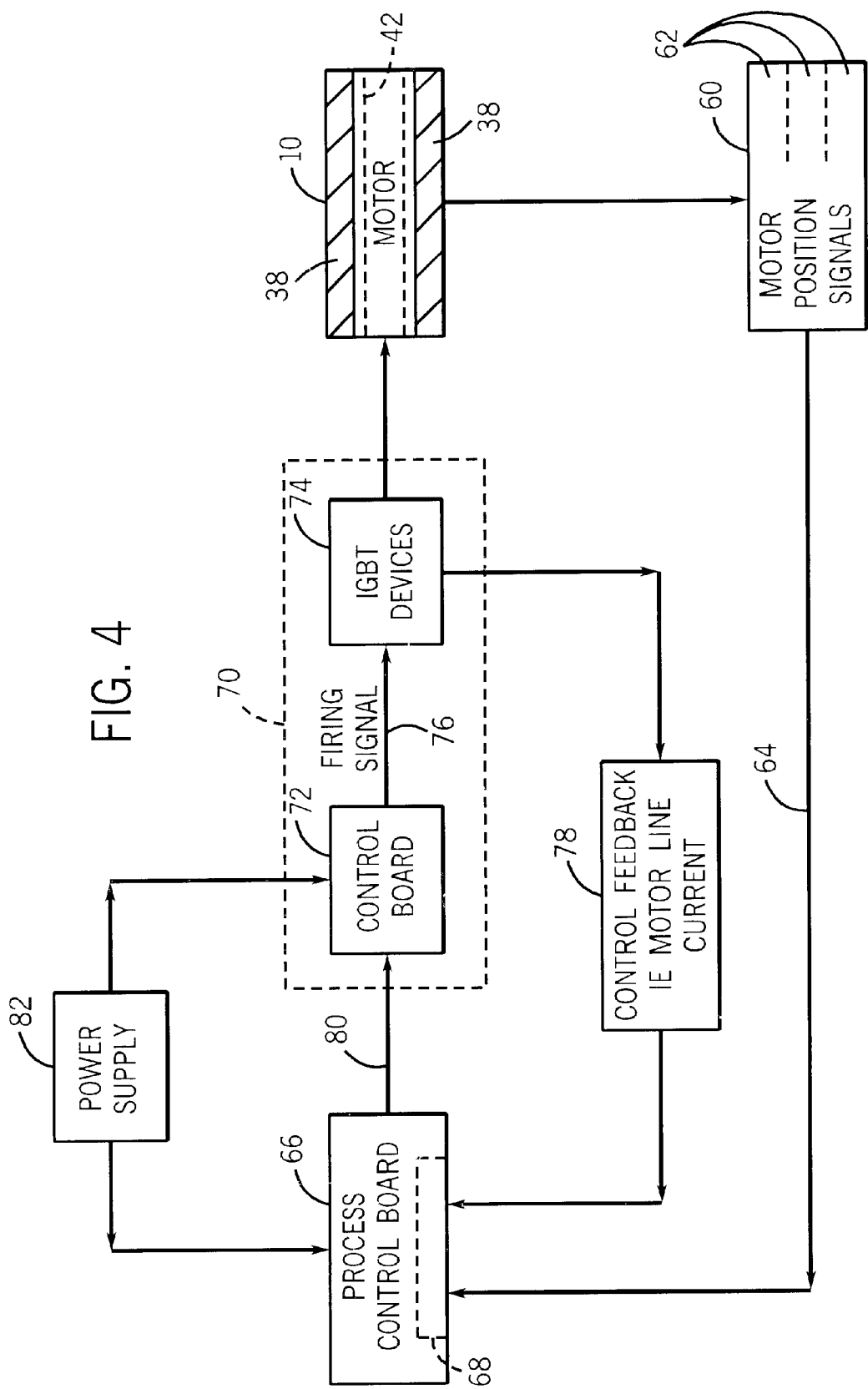
FIG. 4 is a schematic diagram of a motor control system, according to a preferred embodiment of the present invention.

Referring now to FIG. 4, a preferred embodiment of the present invention is illustrated. A motor position sensor system 60 is connected to motor 10 to sense the position of motor 10, i.e. the position of rotor assembly 42. This position may be sensed by sensing the rotor assembly position directly or by sensing the winding BEMFs. Preferably, a plurality of sensors, such as Hall effect sensors 62, are utilized to directly detect the position of rotor assembly 42. As with conventional motor control systems, the Hall effect sensors 62 are located in a fixed position on the motor to sense the position of permanent magnets 44, and thus the angular position of rotor assembly 42, as the rotor assembly rotates.

Motor position sensor system 60 outputs a position feedback signal 64 to a process control board 66 containing a processor 68, e.g. a microprocessor.

Windings 38 of motor 10 are energized by an energization system 70 that preferably comprises a control board 72 and a plurality of IGBT devices 74. The control board 72 outputs a firing signal 76 to the IGBT devices which, in turn, energize windings 38 of motor 10 according to the input received from firing signals 76.

Process control board 66, and specifically microprocessor 68, is connected to control board 72 to affect the control of energization system 70 by altering position feedback signal 64. Signal 64 is altered to optimize the energization of windings 38 for improved optimum motor performance under a variety of operating conditions.

In the prior art design, control board 72 receives position feedback signal 64 directly and outputs firing signal 76 based on the position feedback signal 64. As described above, however, inputs external to the control system, such as a twisting rotor assembly, can render feedback signal 64 unreliable in maintaining optimal operation of motor 10.

In the present design, process control board 66 and processor 68 monitor a feedback control signal 78, and effectively adjust the position feedback signal 64 to output a modified control signal 80 to control board 72. The modified control signal 80 causes control board 72 to optimize firing signal 76 and the energization of windings 38 relative to that achieved with the unmodified feedback signal 64.

In the preferred embodiment, feedback control signal 78 is a motor line current output at IGBT devices 74, as illustrated, or directly from motor 14. Microprocessor 68 is programmed to adjust the phasing of the position feedback signal 64 from Hall effect sensors 62 to minimize the feedback control signal 78, e.g. motor line current, during operation. The minimization of the motor line current optimizes motor performance during various stages of motor operation, including startup and operation under load. The phasing of the position feedback signals is modified under real-time and during actual motor operation.

Other feedback control signals, however, also can be used to optimize motor performance. For example, the DC line current output from the IGBT devices can be utilized, and motor performance can be optimized by minimizing the DC line current. Additionally, the position feedback signal 64 can be modified in a variety of ways for optimizing the performance of the overall system. For example, the position feedback signal can be advanced or retarded to change the ultimate firing of the IGBT devices. Also, the phase relationship between the position feedback signals 64 and the firing signals 76 can be changed. Furthermore, the duration of the on and/or off cycles of the firing signals can be altered. Furthermore, a combination of these modifications can be used in modifying the position feedback signal 64 to cause a change in output of the firing signal 76 and an optimization of the performance of motor 10. It should be noted that power is provided to process control board 66, microprocessor 68 and control board 72 by an appropriate power supply 82.

Figure 5:
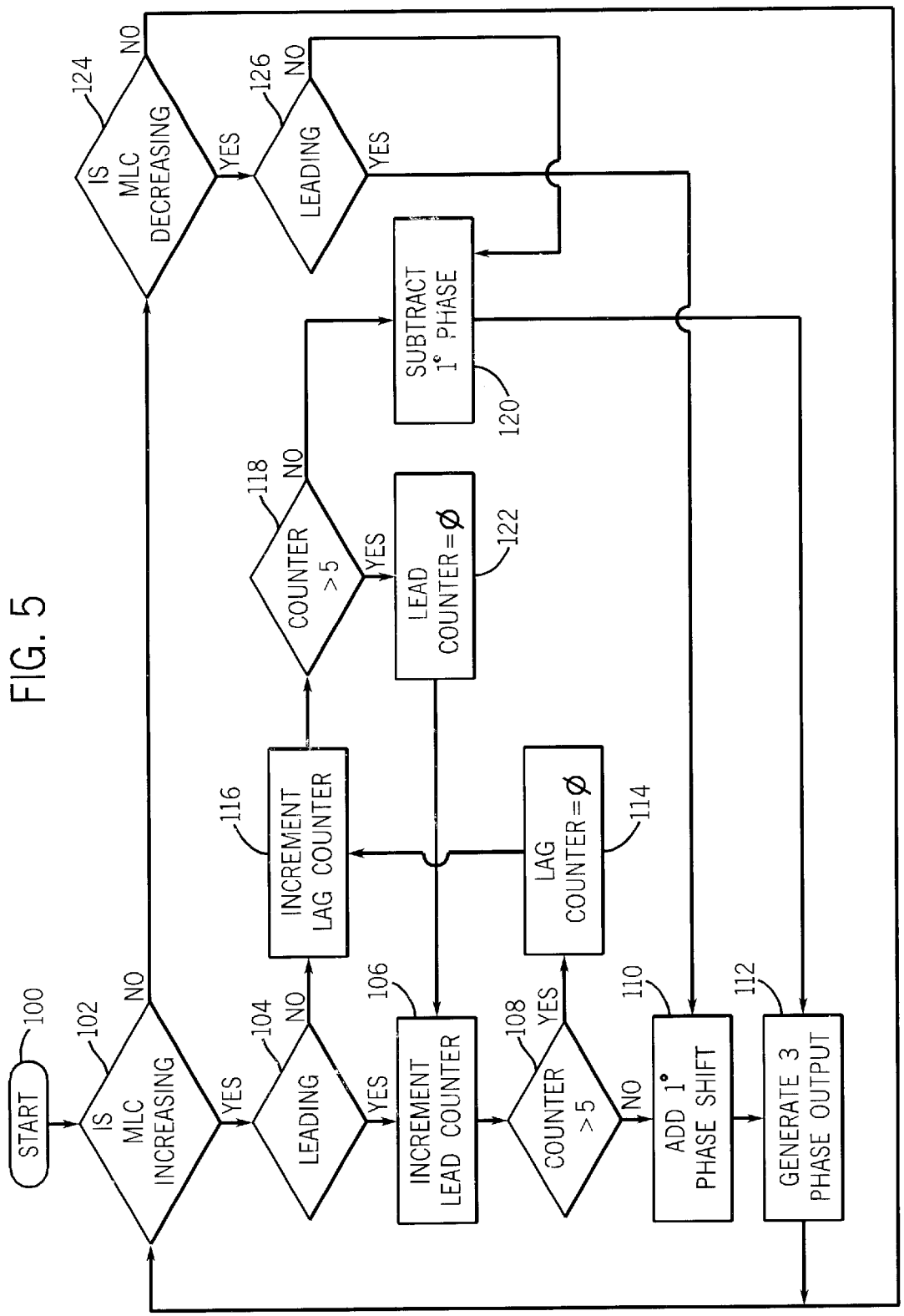
FIG. 5 is a block diagram representing the phase control logic utilized in the control system illustrated in FIG. 4.

Referring generally to FIG. 5, a flow chart is provided to illustrate an exemplary logic or functionality of microprocessor 68 in generating modified control signal 80 based on the input of the position feedback signal 64 and the feedback control signal 78, e.g. the motor line current output at the IGBT devices 74 or motor 10. In this embodiment, microprocessor 68 is programmed to modify the phasing of input position feedback signal 64, and to output modified control signal 80 to control board 72.

Initially, microprocessor 68 is powered, as indicated by a start block 100. The microprocessor then determines whether the feedback control signal 78 is changing, e.g. whether the motor line current is increasing, as represented by decision block 102. If the motor line current is increasing, microprocessor 68 determines whether the phase of modified control signal 80 output from microprocessor 68 is leading the phasing of the position feedback signal 64 input to microprocessor 68, as represented by decision block 104.

Provided the output signal is leading the input signal, microprocessor 68 increments an internal lead counter, as indicated by block 106. A determination is then made whether the lead counter is greater than five as indicated by decision block 108. If the lead counter is at five or less, one degree of phase shift is added to position feedback signal 64 (see block 110) and output as modified control signal 80, as represented by block 112. When the motor line current is increasing, the above-described cycle repeats and adds one degree of phase shift until either the lead counter exceeds five (decision block 108) or the output signal 80 is no longer leading the input signal 64 (see decision block 104).

If the lead counter exceeds five, an internal lag counter is set at zero, as indicated by block 114. Following the resetting of the lag counter to zero, the lag counter is incremented by one, as indicated in block 116. If, on the other hand, the output signal fails to lead the input signal (decision block 104) prior to the lead counter exceeding a count of five (see decision block 108), then the lag counter is incremented, as indicated by block 116.

In either event, microprocessor 68 determines whether the lag counter exceeds a count of five, as indicated by decision block 118. If the lag counter is five or less, one degree of phase shift is subtracted from the input position feedback signal 64 and output as modified control signal 80, as indicated by a block 120 and block 112. If, on the other hand, the lag counter exceeds a count of five, the lead counter is reset to zero, as indicated by block 122. The lead counter is then incremented (see block 106) which logically again leads to decision block 108, as described above.

As represented by decision block 102, if the motor line current is not increasing, microprocessor 68 determines whether the motor line current is decreasing (see decision block 124). If the motor line current is not decreasing, the logic requires a return to decision block 102 to determine whether the motor line current is increasing. Generally, however, the motor line current will either be increasing or decreasing.

If the motor line current is decreasing, the microprocessor determines whether the output signal, e.g. modified control signal 80, is leading the input signal, e.g. position feedback signal 64, as represented by decision block 126. If the output signal is not leading the input signal, one degree of phase shift is subtracted from the input signal, as indicated by block 120, and the modified signal is output as indicated by block 112. If, however, the output signal is leading the input signal, then one degree of phase shift is added to the input signal, as indicated by block 110, and the modified signal is output, as indicated by block 112.

By utilizing the logic described above and set forth in FIG. 5, the energization of motor 10 by energization system 70 can continually be optimized on a real-time basis. The microprocessor 68 allows the continual modification of position feedback signal 64 to minimize the motor line current and thereby optimize motor performance.

It will be understood that the foregoing description is of a preferred exemplary embodiment of this invention, and that the invention is not limited to the specific forms shown. For example, a variety of motors may be incorporated into the overall system; a variety of position sensors and winding energization devices may be used; other control feedback signals may be utilized; and the control logic may be modified or changed to achieve similar results or to adapt to the use of different feedback control signals. These and other modifications may be made in the design and arrangement of the elements without departing from the scope of the invention as expressed in the appended claims.

What is claimed is:

1. An electric motor system, comprising:
   a stator having a plurality of windings;
   a rotor rotatably mounted in the stator;
   an energization circuit, comprising a controller and a plurality of electronic switching devices operated by the controller, coupled to the stator to sequentially energize the plurality of windings;
   a position sensor coupled to the rotor to sense rotor position;
   a processor coupled to the energization system and the position sensor to process an input signal from the position sensor system and output a control signal to the energization system based on the input signal; and
   a feedback device coupled to the processor to generate a feedback control signal to the processor, wherein the processor automatically adjusts the control signal to the energization system according to the feedback control signal to compensate for twisting of the rotor during operation.

2. The electric motor system as recited in claim 1, wherein the position sensor system comprises a plurality of Hall effect devices.

3. The electric motor system as recited in claim 1, wherein the controller is disposed on a control board.

4. The electric motor system as recited in claim 3, wherein the feedback control signal is a motor line current signal.

5. The electric motor system as recited in claim 4, wherein the motor line current signal is output at the plurality of IGBT devices.

6. The electric motor system as recited in claim 1, wherein the processor is configured to adjust the phasing of the input signals received from the position sensor system.

7. The electric motor system as recited in claim 6, wherein the rotor includes a plurality of permanent magnets and the position sensor system includes a plurality of Hall effect devices.

8. A method for optimizing performance of a motor having a stator with a plurality of windings and a rotor rotatably mounted with respect to the stator, comprising:

sequentially energizing the plurality of windings to rotate the rotor;

measuring the angular position of the rotor;

outputting a position feedback signal, indicative of a position of the rotor, to a processor;

outputting a control feedback signal to the processor;

adjusting the position feedback signal according to the control feedback signal to compensate for twisting of the rotor during operation; and controlling energization of the plurality of windings according to the adjusted position feedback signal.

9. The method as recited in claim 8, further comprising detecting a twisting of the rotor and outputting the control feedback signal as an indicator of the degree of twisting.

10. The method as recited in claim 8, wherein adjusting comprises changing the phasing of the position feedback signal.

11. The method as recited in claim 8, wherein outputting the control feedback signal comprises outputting a motor line current signal.

12. The method as recited in claim 8, wherein adjusting includes adjusting the position feedback signal to minimize the motor line current signal.

13. The method as recited in claim 8, further comprising providing the adjusted position feedback signal to a plurality of IGBT devices that selectively energize the plurality of windings.

14. The method as recited in claim 13, wherein outputting the feedback signal comprises outputting a motor line current signal from the motor to the processor; and adjusting comprises adjusting the position feedback signal to minimize the motor line current signal.

15. A method for real-time adjustment of a motor to reduce the detrimental performance effects of a twisting of a motor shaft on which a rotor is mounted, comprising:

measuring the angular position of the rotor at an axial position along the rotor;

measuring a parameter indicative of a degree of twisting in the motor shaft on which a rotor is mounted;

outputting a feedback signal corresponding to the angular position; and controlling energization of the motor based on the feedback signal and the parameter to compensate for the degree of twisting in the motor shaft on which a rotor is mounted.

16. The method as recited in claim 15, wherein measuring a parameter comprises measuring a motor line current.

17. The method as recited in claim 16, wherein controlling energization comprises minimizing the motor line current.

18. The method as recited in claim 15, further comprising adjusting the phasing of the feedback signal to create an adjusted feedback signal based on the parameter.

19. The method as recited in claim 18, further comprising directing the adjusted feedback signal to a plurality of IGBT devices that control the energization of the motor.

* * * * *